United States Patent
Atherton (10) Patent No.: US 9,502,927 B2
(45) Date of Patent: Nov. 22, 2016

(54) LINEAR GENERATOR WITH TANGENTIAL INDUCTION

(76) Inventor: Nigel Andrew Atherton, Loughborough (GB)

(*) Notice: Subject to any disclaimer, the term of this patent is extended or adjusted under 35 U.S.C. 154(b) by 978 days.

(21) Appl. No.: 13/643,212

(22) PCT Filed: Apr. 21, 2011

(86) PCT No.: PCT/EP2011/056415
§ 371 (c)(1),
(2), (4) Date: Feb. 6, 2013

(87) PCT Pub. No.: WO2011/134886
PCT Pub. Date: Nov. 3, 2011

(65) Prior Publication Data
US 2013/0127268 A1    May 23, 2013

(30) Foreign Application Priority Data

Apr. 30, 2010 (GB) .................................. 1007214.8

(51) Int. Cl.
| | |
|---|---|
| *H02K 1/06* | (2006.01) |
| *G01P 3/22* | (2006.01) |
| *G01P 3/49* | (2006.01) |
| *H02K 7/18* | (2006.01) |
| *H02K 49/04* | (2006.01) |
| *H02K 7/06* | (2006.01) |
| *H02K 49/10* | (2006.01) |

(52) U.S. Cl.
CPC . *H02K 1/06* (2013.01); *G01P 3/22* (2013.01); *G01P 3/49* (2013.01); *H02K 7/1853* (2013.01); *H02K 49/04* (2013.01); *H02K 7/06* (2013.01); *H02K 49/10* (2013.01)

(58) Field of Classification Search
USPC .................................. 310/46, 15, 20, 27, 37
See application file for complete search history.

(56) References Cited

U.S. PATENT DOCUMENTS

| | | | | |
|---|---|---|---|---|
| 3,601,641 | A | | 8/1971 | Baermann |
| 5,495,131 | A | * | 2/1996 | Goldie ................... H02K 17/16 310/112 |
| 5,717,264 | A | * | 2/1998 | Hadano .................. D01H 1/244 310/103 |
| 5,945,762 | A | * | 8/1999 | Chen ........................ A61N 1/08 128/899 |

(Continued)

FOREIGN PATENT DOCUMENTS

| | | |
|---|---|---|
| CN | 101286670 | 10/2008 |
| DE | 3918150 | 12/1990 |

(Continued)

OTHER PUBLICATIONS

International Search Report for PCT Application No. PCT/EP2011/056415 issued Apr. 17, 2012.

(Continued)

*Primary Examiner* — Naishadh Desai
(74) *Attorney, Agent, or Firm* — Meyertons, Hood, Kivlin, Kowert & Goetzel, P.C.; Eric B. Meyertons (57) ABSTRACT

Embodiments of the invention relate to an electricity generator system. The system comprises: a conductor; a magnet; and conversion means. The magnet is configured such that motion of the conductor relative to the magnet induces a current in the conductor and the induced current in the conductor causes motion of the magnet. The conversion means are configured to convert motion of the magnet to electricity.

14 Claims, 7 Drawing Sheets

(56) References Cited

U.S. PATENT DOCUMENTS

| | | | | |
|---|---|---|---|---|
| 6,812,583 | B2* | 11/2004 | Cheung | H02K 35/02 |
| | | | | 290/1 A |
| 2004/0144611 | A1 | 7/2004 | Wolf et al. | |
| 2004/0251750 | A1* | 12/2004 | Cheung | H02K 35/02 |
| | | | | 310/23 |
| 2006/0158055 | A1* | 7/2006 | Ivtsenkov | H02K 21/24 |
| | | | | 310/156.01 |
| 2008/0074083 | A1* | 3/2008 | Yarger | H01M 6/5033 |
| | | | | 320/137 |
| 2008/0211435 | A1* | 9/2008 | Imagawa | B06B 1/045 |
| | | | | 318/130 |
| 2008/0224550 | A1* | 9/2008 | Hyun | H02K 49/102 |
| | | | | 310/46 |

FOREIGN PATENT DOCUMENTS

| | | |
|---|---|---|
| EP | 0793329 | 9/1997 |
| FR | 2180622 | 11/1973 |
| GB | 965429 | 7/1964 |
| GB | 1418820 | 12/1975 |
| GB | 2087951 | 6/1982 |
| GB | 2264812 | 9/1993 |
| JP | 55160860 | 12/1980 |
| JP | 9074777 | 3/1997 |
| JP | 2000197340 | 7/2000 |
| JP | 2006105210 | 4/2006 |
| KR | 20030072034 | 9/2003 |
| WO | 9847215 | 10/1998 |
| WO | 2009100022 | 8/2009 |

OTHER PUBLICATIONS

Written Opinion for PCT Application No. PCT/EP2011/056415 issued Apr. 17, 2012.

International Preliminary Report on Patentability for PCT Application No. PCT/EP2011/056415 issued Nov. 6, 2012.

* cited by examiner

LINEAR GENERATOR WITH TANGENTIAL INDUCTION

Embodiments of the present invention relate to an electricity generator. In particular, they relate to an electricity generator used for harvesting energy from a moving conductor.

Commonly used methods of generating electricity, such as gas or coal fired power stations may be detrimental to the environment. Therefore it would be beneficial to provide an alternative method of generating electricity which could be used to supplement the electricity generated by such power stations and which lessens the damage to the environment.

It would also be beneficial to provide a method of generating electricity which could be used to provide localised power supplies for locations where it may be difficult to provide an external power supply.

According to embodiments of the invention there is provided an electricity generator system comprising: a conductor; a magnet; and conversion means wherein the conversion means are configured to convert motion of the magnet to electricity wherein the magnet is configured such that motion of the conductor relative to the magnet induces a current in the conductor and the induced current in the conductor causes motion of the magnet via the magnetic field created by the induced current.

In some embodiments of the invention the magnet may comprise a permanent magnet. In some embodiments of the invention the magnet may comprise a cylindrical magnet with diametric poles. In other embodiments of the invention the magnet may comprise a spherical magnet. The magnet may comprise more than two poles.

In some embodiments of the invention the magnet may be arranged so that it is not physically coupled to the conductor.

In some embodiments of the invention the magnet may be mounted on a spindle held in bearings. In some embodiments of the invention the magnet may be mounted on a flexible member. In other embodiments of the invention the magnet may be free to move within a casing.

In some embodiments of the invention the conversion means may comprise a coil around the magnet. The motion of the magnet may induce a current in the coil.

In some embodiments of the invention the energy generator system may also comprise a coupling means configured to couple the magnet to the conversion means.

According to embodiments of the invention there is also provided an electricity generator comprising: a magnet; and conversion means wherein the conversion means are configured to convert motion of the magnet to electricity wherein the magnet is configured such that motion of a conductor relative to the magnet induces a current in the conductor and the induced current in the conductor causes motion of the magnet via the magnetic field created by the induced current.

According to embodiments of the invention there is also provided a motion detector comprising an electricity generator as described in the preceding paragraph.

For a better understanding of various examples of embodiments of the present invention reference will now be made by way of example only to the accompanying drawings in which.

The Figures illustrate an electricity generator system 1 comprising: a conductor 5; a magnet 7; and conversion means 11 wherein the conversion means 11 are configured to convert motion of the magnet 7 to electricity and wherein the magnet 7 is configured such that motion of the conductor 5 relative to the magnet 7 induces a current in the conductor 5 and the induced current in the conductor 5 causes motion of the magnet 7 via the magnetic field created by the induced current.

Figure 1:
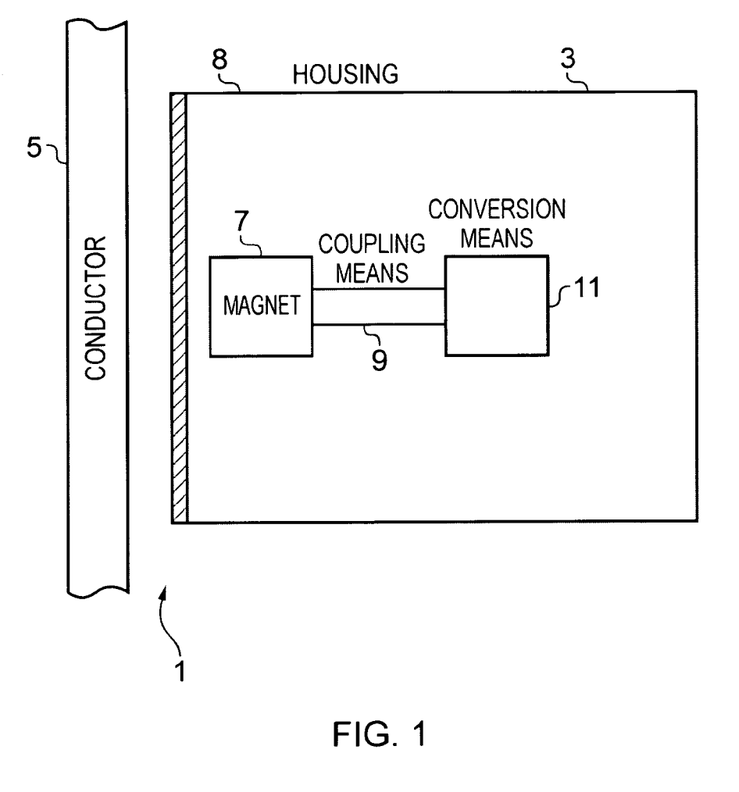
FIG. 1 schematically illustrates an electricity generator system according to an embodiment of the invention.

FIG. 1 schematically illustrates an electricity generator system 1 according to an embodiment of the invention. The electricity generator system 1 comprises a conductor 5 and an electricity generator 3. The electricity generator comprises a magnet 7 and conversion means 11. A coupling means 9 may be provided to couple the magnet 7 to the conversion means 11.

The conductor 5 may comprise any material which conducts electricity. For example the conductor 5 may comprise a metal such as aluminium or copper. In some embodiments of the invention the conductor 5 may comprise a layer of conductive material mounted on a non conductive material. For example, a layer of copper may be mounted on a layer of plastic or resin. In other embodiments of the invention the conductor 5 may comprise a metal in a liquid state or an electrolyte.

The conductor 5 may be configured to move relative to the magnet 7. The movement of the conductor 5 may comprise motion in any direction. For example, the movement may comprise linear motion, rotary motion or vibrations of the conductor 5. In some embodiments of the invention the motion of the conductor 5 may be continuous. For example, the conductor 5 may be a continuously rotating part of an engine such as a wheel or a rotating shaft. In other embodiments of the invention the motion of the conductor 5 may be periodic, for example, the conductor 5 may comprise a pendulum or spring which accelerates and decelerates periodically. In other embodiments of the invention the motion of the conductor 5 may be transient, that is, the motion may last for only a short period of time. For example, the conductor may be a passing object such as a vehicle or car.

The conductor 5 may be positioned close to the magnet 7 so that the conductor is within the magnetic field provided by the magnet 7. However, the conductor 5 is not physically coupled to the magnet 7 or any other part of the electricity generator 3. This means that the movement of the conductor 5 relative to the magnet 7 is not restricted by any physical connection to the magnet 7.

The electricity generator 3 comprises a magnet 7, conversion means 11 and coupling means 9 and may be contained within a housing 8.

The housing 8 may provide a protective barrier between the components of the electricity generator 3. The housing 8 may be configured to protect the components of the electricity generator 3 from environmental conditions such as temperatures or moisture. The housing 8 may also be configured to protect the electricity generator from damage due to impact, for example, if another object were to collide with the electricity generator 3.

The housing 8 may be made from any suitable material. The housing 8 may be made from a material which does not interfere with the magnetic fields from the magnet 7 and the conductor 5. For example the housing 8 may be made from non-magnetic stainless steel. Different portions of the housing 8 may be made from different materials. For example, the face of the housing 8 closest to the conductor 5 may be made from a different material to the rest of the housing. This may enable some portions of the housing 8 may to act as a shield from external magnetic fields while still enabling the conductor 5 to be influenced by the magnetic field of the magnet 7.

The magnet 7 may be any suitable type of magnet 7. For example the magnet 7 may be a cylindrical magnet, a spherical magnet, a bar magnet a toroidal magnet, a tubular magnet or any other type of magnet. The magnet 7 may comprise more than two poles so that a plurality of north and south poles are provided by a single magnet.

In the illustrated embodiment of the invention the magnet 7 is a permanent magnet. In other embodiments of the invention the magnet 7 may be an electromagnet.

The magnet 7 is mounted within the electricity generator 3 so that the magnet 7 is free to move with at least one degree of freedom. In some embodiments of the invention the magnet 7 may be mounted on a spindle which enables the magnet 7 to rotate about an axis. In other embodiments of the invention the magnet 7 may be mounted on or coupled to a flexible member or spring which enables the magnet 7 to oscillate backwards and forwards as the flexible member or spring flexes. In other embodiments of the invention the magnet 7 may be provided within a casing within the housing 8. The magnet 7 may be free to move within the casing so, for example, the magnet may be free to rotate or roll about any axis. The casing may limit the linear motion of the magnet 7. In other embodiments of the invention the magnet 7 may be mounted on a linear bearing or a slide.

A conversion means 11 is also provided. The conversion means 11 may be provided within the housing of the electricity generator 3. The conversion means 11 may be any means which is configured to convert motion of the magnet 7 into electricity.

In some exemplary embodiments the conversion means 11 comprises a coil positioned around the magnet 7. The coil may comprise a conductive material so that motion of the magnet 7 relative to the coil induces a current within the coil 7. In other embodiments of the invention the conversion means may comprise a mechanical conversion means such as a member which is configured to move whenever the magnet 7 moves. In such embodiments the conversion means may be configured to convert the motion of the member into electricity. It is also to be appreciated that the magnet 7 and coil may be configured in any suitable arrangement. For example, in some embodiments of the invention the coil may be position within a tubular or toroidal magnet.

The electricity generator 3 may also comprise a coupling means 9. The coupling means 9 may comprise any means which enables the magnet 7 to be either physically or electromagnetically connected to the conversion means 11. For example the coupling means 9 may be a mechanical means such as a shaft, gearing or connecting rod which couples the motion of the magnet 7 to a conversion means 11. In other embodiments of the invention the coupling could be any electromagnetic coupling.

In use the magnet 7 provides a magnetic field. The relative strength and shape of the magnetic field will depend upon the type of magnet 7 which is used. For instance, a magnet with a plurality of north and south poles will provide a different shaped magnetic field to a magnet with only one north and south pole.

The conductor 5 moves relative to the magnet 7. The conductor 5 may be any moving conductive surface. For example, in some embodiments the electricity generator 3 may be located within an engine. In such embodiments the conductor 5 may comprise any part of the engine, such as a drive shaft, flywheel, turbine blade or a suspension element.

In other embodiments of the invention the conductor 5 may be a part of a nearby machine such as a pneumatic cylinder, hydraulic ram or pulley. In some other embodiments the conductor 5 may be a passing object such as an escalator, lift, train or other vehicle. As mentioned above the motion of the conductor may be any type of motion. For example, it may be linear, rotational, vibration, continuous, periodic or transient.

As the conductor 5 moves it moves through the magnetic field provided by the magnet 7. This movement causes eddy currents to be induced within the conductor 5. The direction of the eddy currents will depend on the direction of the motion of the conductor 5.

The eddy currents in conductor 5 create their own magnetic fields. The magnetic fields created by the eddy currents provide a force which acts on the magnet 7. The magnitude of the force depends on the configuration of the magnet 7, that is whether it is a cylindrical magnet or a spherical magnet or any other type of magnet and the number of poles of the magnet as well as the magnetic moment of the magnet 7, and also the strength of the magnetic field which is generated by the induced eddy currents.

As the magnet 7 is free to move in at least one direction the force caused by the eddy currents will cause the magnet 7 to move. The coupling means 9 couples the magnet 7 to the conversion means 11 so that the motion of the magnet 7 is converted into electricity by the conversion means 11.

Therefore embodiments of the invention provide a system which may be used to generate electricity from any passing conductor 5.

Figure 2:
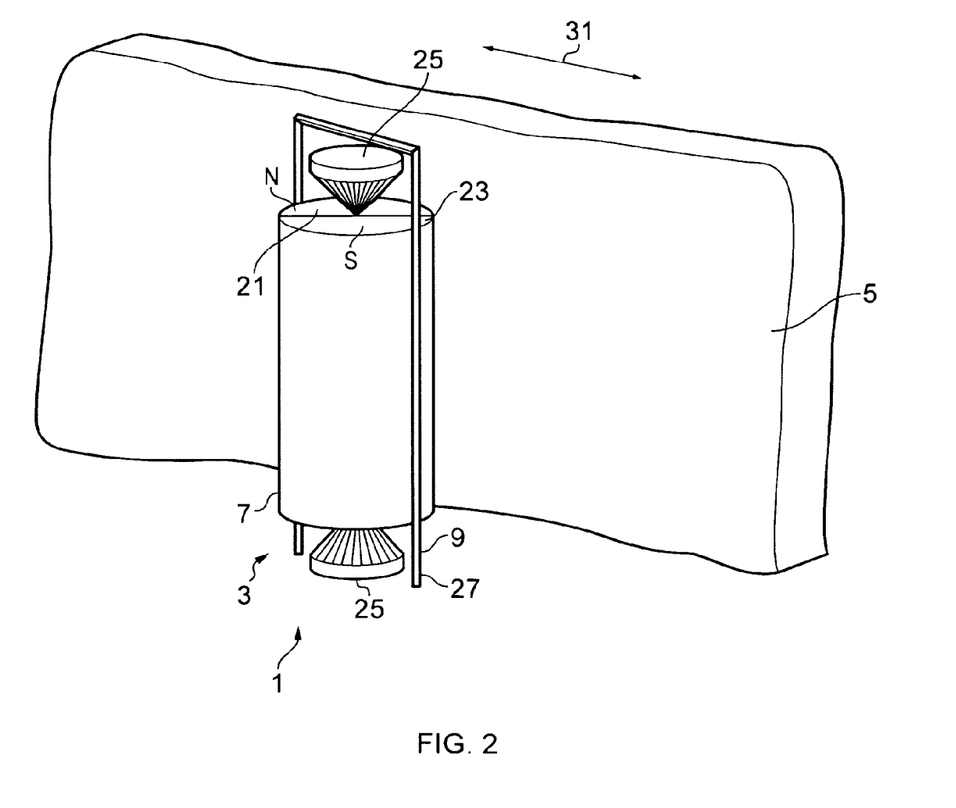
FIG. 2 illustrates an electricity generator system according to an exemplary embodiment of the invention.

FIG. 2 illustrates an electricity generator system 1 according to an exemplary embodiment of the invention in more detail. For clarity, the housing 8 of the electricity generator 3 is not illustrated in FIG. 2 as this would obstruct the view of the components of the electricity generator 3.

In the embodiment illustrated in FIG. 2 the conductor 5 comprises a large sheet of conductive material. The conductive material may be, for example Aluminium or copper. In this particular embodiment the conductor 5 is configured to vibrate backwards and forwards in the directions indicated by the arrow 31. It is to be appreciated that in other embodiments of the invention the conductor 5 may move in just one of the directions.

The conductor 5 is positioned in proximity to, but not touching, the electricity generator 3. The conductor 5 is close enough to the electricity generator 3 so that the motion of the conductor 5 through the magnetic field of the magnet 7 induces eddy currents within the conductor 5.

The magnet 7 is a cylindrical magnet 7 with diametric poles. That is, the north pole 21 and the south pole 23 are provided at diametrically opposite points of the cylinder. In the illustrated embodiment the magnet 7 comprises only one north pole 21 and one south pole 23. It is to be appreciated that in other embodiments of the invention the magnet 7 may have any number of north and south poles.

The magnet 7 is mounted on a spindle. The spindle extends along the central axis of the cylinder. The spindle is mounted on bearings 25 which enables the magnet 7 to rotate about the axis. The bearings 25 may be any suitable type of bearings, for example the bearings may be ball bearings. The ball bearings may be metal or ceramic bearings. In other embodiments of the invention the bearings may be plain bearings or jewel bearings. In other embodiments of the invention the magnet 7, or spindle to which the magnet is attached, may be mounted on one bearing or a plurality of bearings.

In the exemplary embodiment illustrated in FIG. 2 the conversion means 11 comprises a coil 27 which is provided around the magnet 7. The coil 27 comprises conductive material so that when the magnet 7 rotates a current is induced in the coil 27. In the embodiment illustrated in FIG. 2 the coil only comprises a single winding. It is to be appreciated that many more windings may be provided in other embodiments of the invention.

When the conductor 5 moves as indicated by the arrow 31 the motion causes eddy currents to be induced in the conductor 5. This induces motion of the magnet and thereby induces a current in the coil as described above in relation to FIG. 1.

Figure 3:
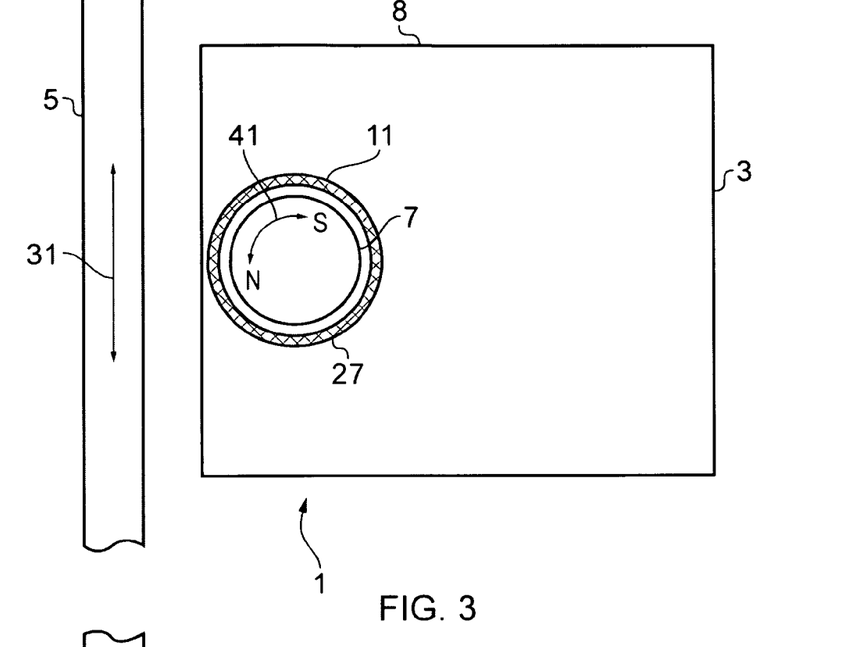
FIGS. 3 to 11 illustrate exemplary embodiments of the invention.

FIG. 3 schematically illustrates an electricity generator system 1 according to a second exemplary embodiment of the invention. As in the previous embodiments the electricity generator 3 comprises a magnet 7 and a conversion means 11 within a housing 8.

In this exemplary embodiment illustrated in FIG. 3 the magnet 7 is a cylindrical magnet with diametric poles and the conversion means 11 comprises a coil 27. The coil 27 extends around the entire circumference of the magnet 7.

The conductor 5 is configured to move backwards and forwards as indicated by the arrow 31. The motion of the conductor 5 may be, for example, a vibration or a periodic motion. The conductor 5 may be in continuous motion or may only be in motion for a short period of time.

In the exemplary embodiment illustrated in FIG. 3 the motion of the conductor 5 causes rotational motion of the magnet 7 as indicated by arrow 41. This motion of the magnet induces a current in the surrounding coil 27.

Figure 4:
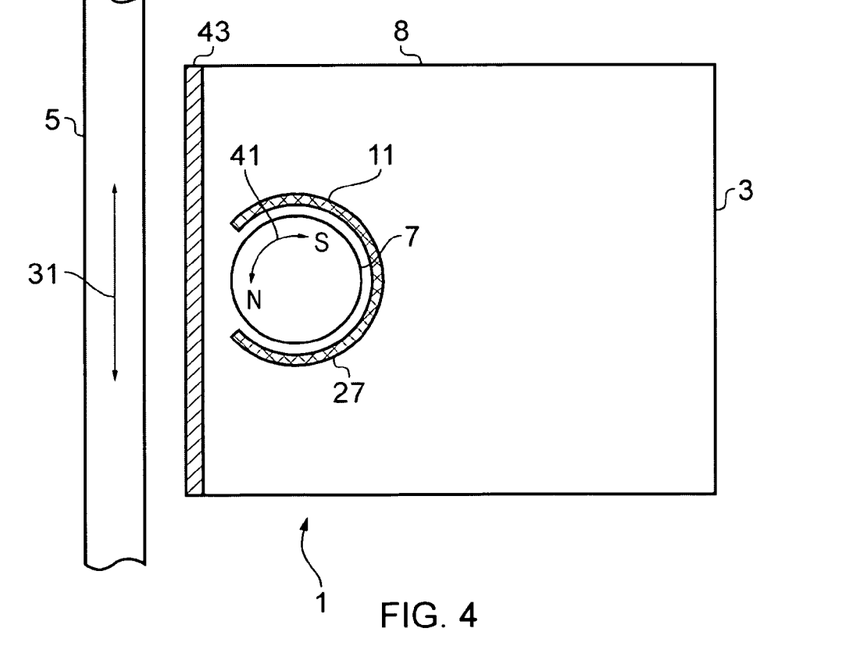

FIG. 4 schematically illustrates an electricity generator system 1 according to a third exemplary embodiment of the invention. The third exemplary embodiment of the invention is similar to the second exemplary embodiment of the invention. However, in the third exemplary embodiment the coil 27 only extends around a portion of the circumference of the magnet 7.

Also in the third exemplary embodiment of the invention a first side 43 of the housing 8 is made from a different material to the rest of the housing 8 as indicated by the shaded portion. In use the first side 43 may be the side of the housing 8 which is closest to the conductor 5.

Figure 5:
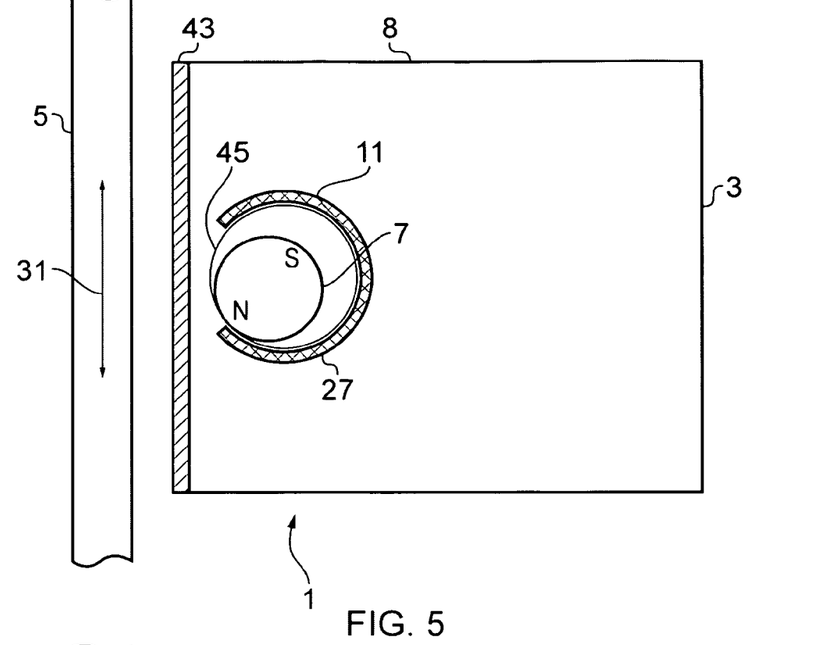

FIG. 5 schematically illustrates an electricity generator system 1 according to a fourth exemplary embodiment of the invention. The fourth exemplary embodiment of the invention is similar to the third exemplary embodiment of the invention. However, in the fourth exemplary embodiment the magnet 7 is positioned within a casing 45. In this exemplary embodiment the casing 45 is also cylindrical and has a larger diameter than the magnet 7 so that the magnet can move freely within the casing. The coil 27 is provided so that it extends around a portion of the circumference of the casing 45.

In the embodiment illustrated in FIG. 5, the motion of the conductor 5 may cause the magnet 7 to move within the casing 45. The movement of the magnet 7 may comprise both linear and rotational components.

Figure 6:
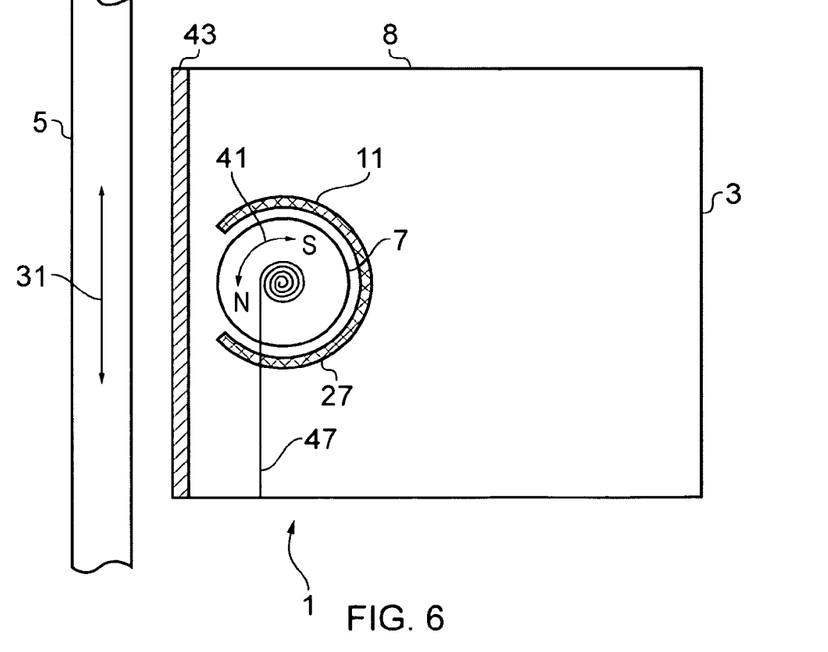

FIG. 6 schematically illustrates an electricity generator system 1 according to a fifth exemplary embodiment of the invention. The fifth exemplary embodiment of the invention is similar to the third exemplary embodiment of the invention. However, in the fifth exemplary embodiment the magnet 7 is mounted on a spring 47. The spring 47 may be a balance spring or a hair spring and is configured to allow motion of the magnet 7 as indicated by the arrow 41. In this particular embodiment the motion may be rotary oscillation.

The spring 47 and magnet 7 may be configured so that the magnet 7 is caused to move, as described above, when a conductor 5 moves through the magnetic field of the magnet 7. This motion may cause the magnet 7 and spring 47 to oscillate so that the magnet 7 continues to move even if the conductor 5 stops moving or moves out of the magnetic field of the magnet 7. In some embodiments of the invention an additional mass may be provided to increase the moment of inertia of the magnet 7.

Figure 7:
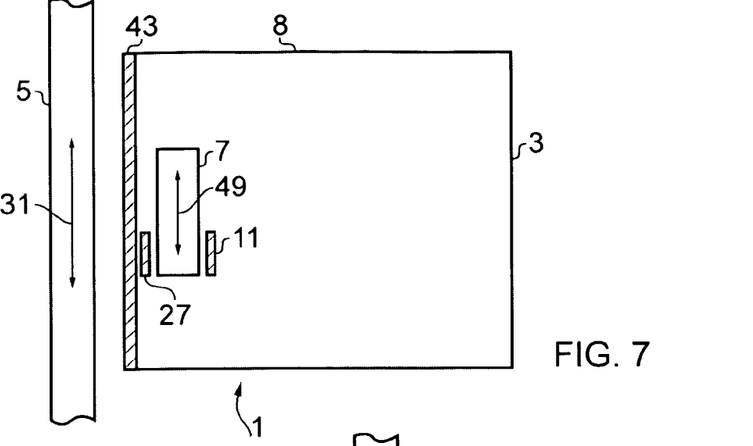

FIG. 7 schematically illustrates an electricity generator system 1 according to a sixth exemplary embodiment of the invention. As in the previous embodiments the electricity generator 3 comprises a magnet 7 and a conversion means 11 within a housing 8.

In this exemplary embodiment illustrated in FIG. 7 the magnet 7 is a bar magnet with a rectangular cross section. The conversion means 11 comprises a coil 27 which extends around a portion of the magnet 7.

As in FIGS. 3 to 6 the conductor 5 is configured to move backwards and forwards as indicated by the arrow 31. However, in the exemplary embodiment illustrated in FIG. 7 the motion of the conductor 5 causes linear motion of the magnet 7 as indicated by the arrow 49.

Figure 8:
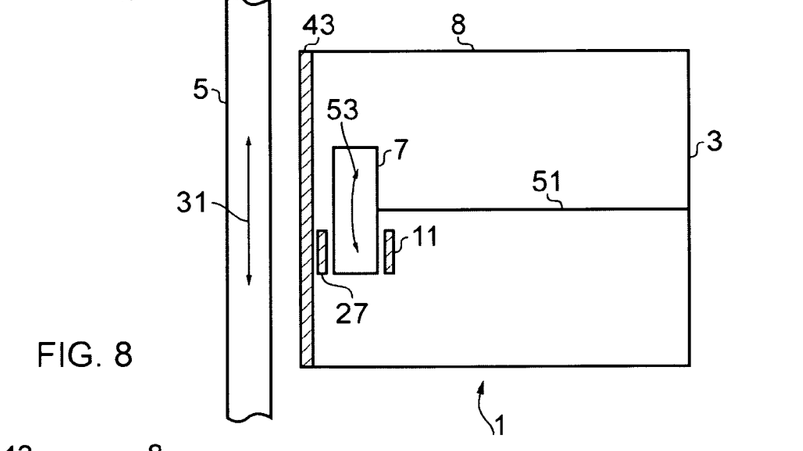

FIG. 8 schematically illustrates an electricity generator system 1 according to a seventh exemplary embodiment of the invention. The seventh exemplary embodiment of the invention is similar to the sixth exemplary embodiment of the invention. However, in the seventh exemplary embodiment the magnet 7 is mounted on a flexible member 51. The flexible member 51 may comprise any suitable type of spring and is configured to allow motion of the magnet 7 as indicated by the arrow 53. As the length of the spring 51 is constant the motion of the magnet 7 follows a slightly curved path as indicated by the arrow 53.

Figure 9:
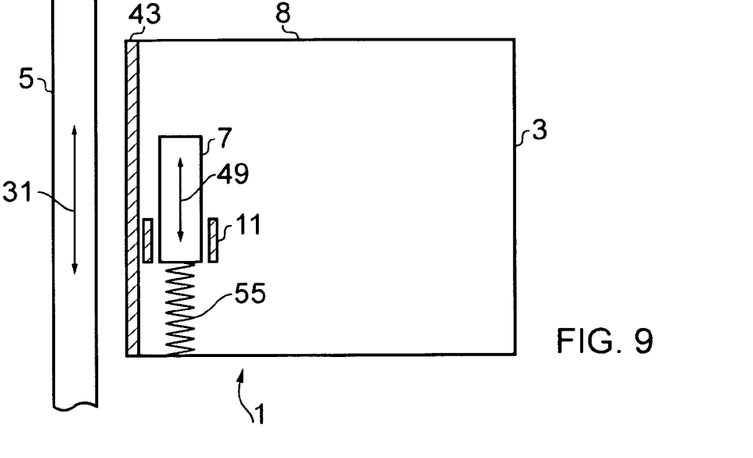

FIG. 9 schematically illustrates an electricity generator system 1 according to an eighth exemplary embodiment of the invention. The eighth exemplary embodiment of the invention is similar to the sixth exemplary embodiment of the invention. However, in the eighth exemplary embodiment the magnet 7 is coupled to a flexible member 55. In the eighth embodiment the flexible member comprises a spring such as a helical spring and is configured to allow linear motion of the magnet 7 as indicated by the arrow 49.

The embodiments of the invention as described above provide an energy generator which may use the movement of any moving conductor to generate electricity. Embodiments of the invention may be used to provide a localised power source. In some embodiments of the invention the system may be used to provide power for wireless sensors and systems. In other embodiments of the invention the system may be used to provide an auxiliary power source for equipment such as pumps, heaters control systems. The equipment may be fixed or remote equipment.

Embodiments of the invention may be used within a motion detector. The motion detectors may be located within an engine, for example they may be used to detect and measure the motion of the parts of the engine. Alternatively it may be used to detect whenever a conductor has passed by, for example it may detect the movement of passing traffic or trains. The motion detector may also be configured to count and record such events. The electricity generated by the electricity generator 3 may be used to power the motion detector so that no external power source is needed. This provides the advantage that no external power source is needed for the motion detector. In such embodiments the motion detector may also comprise a transmitter module which may be powered by the electricity generator to enable the motion detector to transmit motion information to other locations by wireless means. This makes it suitable for use in an environment where it is difficult to provide an external power source.

Some embodiments of the invention may be used in environments where it is advantageous to decrease the kinetic energy of a passing conductor. For example, embodiments of the invention may be positioned near hazards, such as junctions, in roads so that the decelerating vehicles provide the conductor 5 in the system 1.

It is to be appreciated that only components of the system 1 which are essential for the understanding of the invention have been described above.

Embodiments of the invention may also comprise components which have not been illustrated in FIGS. 1 to 9.

Figure 10:
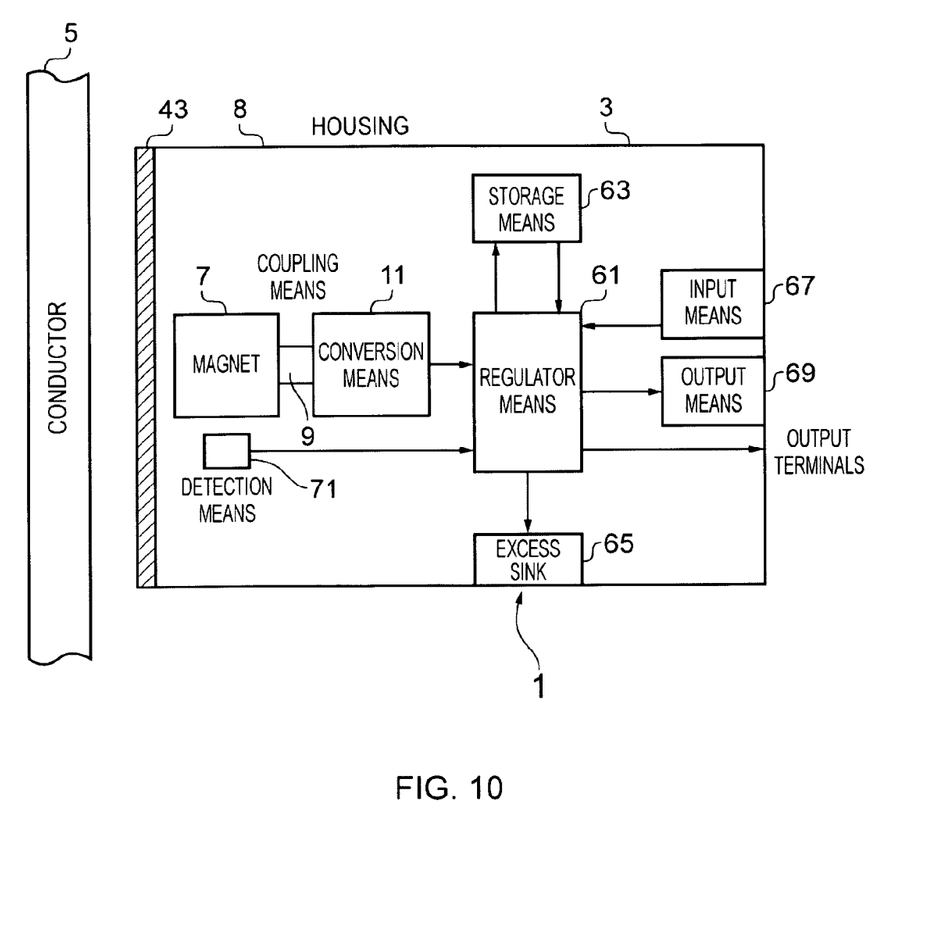

FIG. 10 schematically illustrates an electricity generator 3 comprising other components. In particular the electricity generator 3 comprises regulator means 61, storage means 63, input means 67, output means 69 and an excess sink 65. The electricity generator 3 may also comprise detection means 71.

The detection means 71 may comprise any means which is configured to detect a change in the position of the magnet 7. The detection means 71 may be configured to provide an output to the regulator means 61. The detection means 71 may also be configured to detect the velocity of the magnet 7.

The regulator means 61 may comprise any means which is configured to regulate the electrical voltage and current provided by the electricity generator 3. The regulator means 61 is configured to receive an output from the conversion means 11. The regulator means 61 may be configured to regulate the electrical current and voltage in response to a signal provided by the detection means 71. The regulator means 61 may be configured to receive an input signal from an input means 67 and provide an output signal via the output means 69. The input signal may be used to control the regulator means 61.

The storage means 63 may comprise any means for storing electrical energy. The storage means 63 may be configured so that electrical energy can be transferred between the storage means 63 and the regulator means 61.

An energy sink 65 may also be provided to enable any excess energy to be disposed of. In some embodiments of the invention the excess energy sink 65 may be a resistive load which is configured to transfer any heat generated to the other side of the housing 8.

In some embodiments of the invention an output device may be provided. A signal may be provided to the output device from the regulator means 61. The output device may be configured to provide an output indicative of the status of the system 1, for example it may provide a visual or audio output every time a conductor 5 passes the electricity generator 3. In other embodiments of the invention the output device may provide an output indicative of the velocity or position of the magnet 7 or an indication of the motion of a conductor relative to the electricity generator 3.

The power output provided by the electricity generator 3 may be dependent upon the size and relative velocity of the conductor 5 as well as the strength of the magnet 7. The power output could range from small scale of a few milli-watts up to several kilo-watts.

Figure 11:
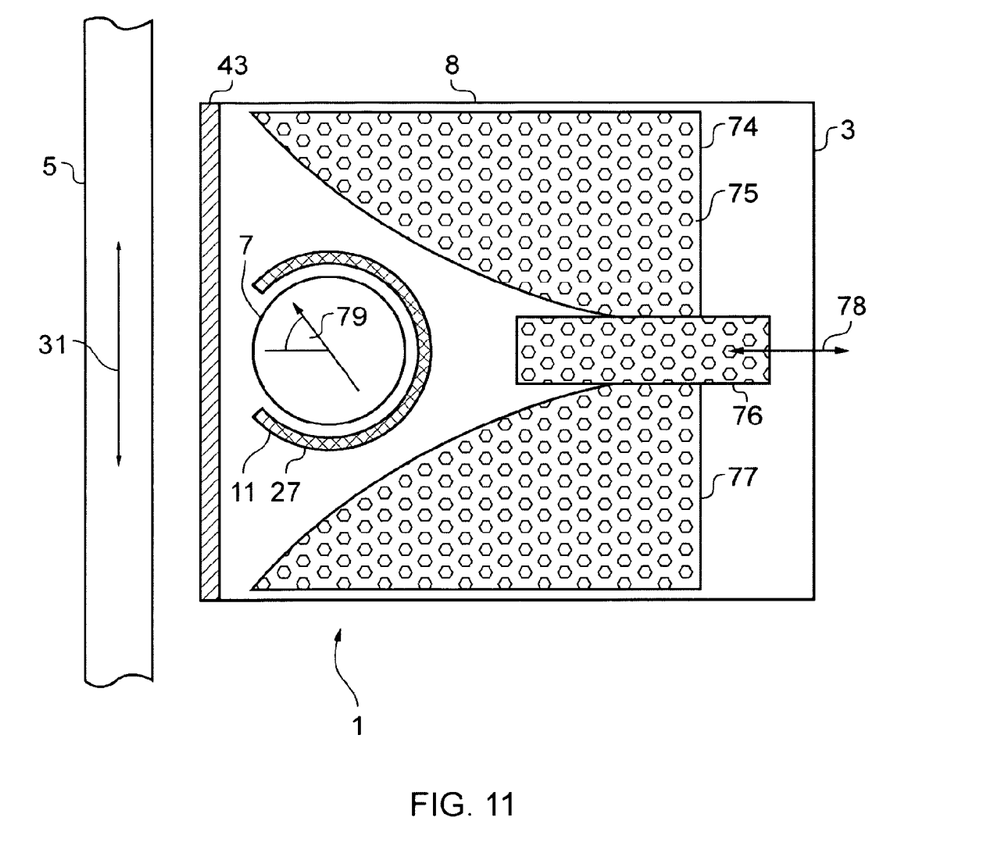

FIG. 11 schematically illustrates an electricity generator system 1 according to a ninth exemplary embodiment of the invention. The ninth exemplary embodiment of the invention is similar to the third exemplary embodiment of the invention as illustrated in FIG. 4 and comprises a cylindrical magnet 7 mounted within a coil 27 which extends around a portion of the circumference of the magnet 7.

In the embodiment of the invention illustrated in FIG. 11 the system also comprises a magnetic shield 74. The magnetic shield 74 may be positioned within the housing 8. The magnetic shield 74 may be configured to enable magnetic flux between the magnet 7 and the conductor 5 through the first side 43 of the housing but prevent magnetic flux through the other sides of the housing 8. In the exemplary embodiment illustrated in FIG. 11 the magnetic shield extends around the whole of the housing 8 except for the first side 43 which is positioned closest to the conductor 5.

The magnetic shield 74 may comprise ferromagnetic or ferrimagnetic materials or any suitable combination of such materials.

In some embodiments of the invention the magnetic shield 74 may be configured to control the operating characteristics of the magnet 7. In the exemplary embodiment illustrated in FIG. 11 the magnetic shield 74 comprises two fixed components 75 and 77 and an adjustable component 76. The adjustable component 76 is configured to enable the distance between the magnet 7 and the magnetic shield 74 to be adjusted. In the embodiment illustrated in FIG. 11 the adjustable component 76 can move in the directions indicated by arrow 78. This controls the magnetic field strength around the magnet 7 and so controls the operating characteristics of the magnet 7.

The position of the adjustable component 76 relative to the magnet 7 may be used to adjust the rest angle 79 of the magnet 7. The rest angle 79 may be the relative angle between the first side 43 of the housing 8 and one of the poles of the magnet 7 when there is no conductor 5 moving past the system 1. This may also control the amount of magnetic flux which passes through the first side 43 of the housing 8.

In the embodiment illustrated in FIG. 11 if the adjustable component 76 is moved away from the magnet 7 this will cause the angle 79 to increase. This causes the magnetic flux through the first side 43 of the housing 8 to decrease and reduces the strength of the interaction between the magnet 7 and the conductor 5. Conversely if the adjustable component 76 is moved closer to the magnet 7 this will cause the angle 79 to decrease. The decrease in the angle 79 will result in an increase in the magnetic flux through the first side 43 of the housing 8 and so increases the strength of the interaction between the magnet 7 and the conductor 5.

The relative position of the magnet 7 and the components of the magnetic shield 74 may also be used to control the restoring force acting on the magnet 7. The restoring force may be used to control the motion of the magnet 7, for example it may be used to enable the magnet 7 to rotate freely or to constrict the magnet 7 so that only oscillations are possible.

It is to be appreciated that in other embodiments of the invention any suitable arrangement of the respective components of the magnetic shield 74 may be used. For example, other embodiments of the invention may comprise more than one adjustable component of the magnetic shield 74. The shape and size and relative position of the magnetic shield 74 may also vary in other embodiments of the invention. In the described embodiments of the invention the operating characteristics are controlled by controlling the position of a component of the magnetic shield 74. In other embodiments of the invention it may be possible to adjust the relative position of the magnet 7.

Although embodiments of the present invention have been described in the preceding paragraphs with reference to various examples, it should be appreciated that modifications to the examples given can be made without departing from the scope of the invention as claimed. For example in the embodiments described above only a single magnet is provided, it is to be appreciated that in other embodiments of the invention more than one magnet may be provided.

In some embodiments of the invention it may be advantageous to reduce the kinetic energy of the magnet. This may be achieved using any suitable method such as increasing the friction of the mounting of the magnet, positioning the magnet in a viscous fluid, providing a mechanical governor, controlling the electrical load connected to the conversion means or magnetic coupling methods.

In some embodiments of the invention the springs may be replaced by electrical means for controlling the oscillation of the magnet. For example, a controller may control the electrical load presented across the output of the conversion means. The oscillation may be controlled to be resonant or non-resonant. In alternative embodiments, the spring elements may be replaced by magnetic spring elements. These may comprise an additional magnet or magnetic material positioned such that there is a restoring force acting upon the magnet.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An electricity generator system for providing electricity to external components, the system comprising:
   a conductor;
   a magnet; and
   conversion means, comprising a coil around at least a portion of the magnet, configured to convert motion of the magnet to electricity,
   wherein the magnet is configured such that motion of the conductor relative to the magnet induces a current in the conductor and the induced current in the conductor causes motion of the magnet via the magnetic field created by the induced current; and
   wherein the caused motion of the magnet is converted to electricity by the conversion means to enable the electricity to be provided to an external component.

2. An electricity generator system as claimed in claim 1 wherein the magnet comprises a permanent magnet.

3. An electricity generator system as claimed in claim 1 wherein the magnet comprises a cylindrical magnet with diametric poles.

4. An electricity generator system as claimed in claim 1 wherein the magnet comprises a spherical magnet.

5. An electricity generator system as claimed in claim 1 wherein the magnet comprises more than two poles.

6. An electricity generator system as claimed in claim 1 wherein the magnet is not physically coupled to the conductor.

7. An electricity generator system as claimed in claim 1 wherein the magnet is mounted on a spindle held in bearings.

8. An electricity generator system as claimed in claim 1 wherein the magnet is mounted on a flexible member.

9. An electricity generator system as claimed in claim 1 wherein the magnet is free to move within a casing.

10. An electricity generator system as claimed in claim 9 wherein the magnet is free to rotate or roll about any axis.

11. An electricity generator system as claimed in claim 10 wherein the motion of the magnet induces a current in the coil.

12. An electricity generator system as claimed in claim 1 wherein the magnet is configured so that the conductor moves tangentially to the magnet.

13. An electricity generator for providing electricity to external components to a generator comprising:
    a magnet; and
    conversion means wherein the conversion means comprises a coil around at least a portion of the magnet configured to convert motion of the magnet to electricity;
    wherein the magnet is configured such that motion of a conductor relative to the magnet induces a current in the conductor and the induced current in the conductor causes motion of the magnet via the magnetic field created by the induced current, and
    wherein the caused motion of the magnet is converted to electricity by the conversion means to enable the electricity to be provided to an external component.

14. A motion detector comprising an electricity generator as claimed in claim 13.

* * * * *